US006734791B2

(12) United States Patent
Kelly et al.

(10) Patent No.: US 6,734,791 B2
(45) Date of Patent: May 11, 2004

(54) ELECTRONICS COMPONENT ASSEMBLY IN A TIRE FOR REMOTELY MONITORING TIRE CONDITIONS

(75) Inventors: Charles Edward Kelly, Simpsonville, SC (US); George Phillips O'Brien, Piedmont, SC (US); Edwin Duane Parsons, Piedmont, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/210,189

(22) Filed: Jul. 31, 2002

(65) Prior Publication Data

US 2004/0021558 A1 Feb. 5, 2004

(51) Int. Cl.$^7$ .............................. B60C 23/00; B60Q 1/00
(52) U.S. Cl. ...................... 340/445; 340/451; 73/146.5; 254/93 VA
(58) Field of Search ................................ 340/438, 442, 340/445, 448, 449, 451, 572.7; 151/151, 152, 415; 73/146, 1.44, 1.57, 1.59, 1.63; 116/34 R, 34 A, 34 B; 343/717, 872; 254/93 R, 93 VA; 250/429; 156/422

(56) References Cited

U.S. PATENT DOCUMENTS

| | | | |
|---|---|---|---|
| 4,004,271 A | 1/1977 | Haven et al. | |
| 4,531,112 A | 7/1985 | Thomas | |
| 4,742,857 A | 5/1988 | Gandhi | |
| 4,970,491 A | 11/1990 | Saint et al. | |
| 5,196,845 A | 3/1993 | Myatt | |
| 5,479,171 A | 12/1995 | Schuermann | |
| 5,616,196 A | 4/1997 | Loewe | |
| 5,928,444 A | 7/1999 | Loewe et al. | |
| 5,987,980 A | * 11/1999 | Mangafas et al. | 73/146.8 |
| 6,062,072 A | * 5/2000 | Mock et al. | 73/146.5 |
| 6,107,969 A | 8/2000 | Gulino et al. | |
| 6,339,956 B1 | * 1/2002 | Huinink et al. | 73/146 |
| 6,518,877 B1 | 2/2003 | Starkey et al. | |

OTHER PUBLICATIONS http://sbe.napier.ac.uk/projects/structeng/University/Statics—Aug. 20, 2003.*
http://www.brainydictionary.com/words/to/torsion231191.html—Aug. 22, 2003.*
www.studyphysics.iwarp.com—Aug. 22, 2003.*

* cited by examiner

Primary Examiner—Jeffery Hofsass
Assistant Examiner—Jennifer Stone
(74) Attorney, Agent, or Firm—Dority & Manning, P.A.

(57) ABSTRACT

An improved electronics component assembly in a tire is provided. The assembly includes a tire and an electronics package for communicating information from the tire to a remote location. The electronics package is located inside of the tire and is connected to an inner portion of the tire. At least a first antenna wire is located inside of the tire and is connected to a portion of the tire. The first antenna wire is connected to the electronics package. The at least first antenna wire is connected to the electronics package so that tension in the at least first antenna wire imparts compression on the electronics package. Additionally, other exemplary embodiments of the present invention exist as previously stated were a second antenna wire is present in order to help impart compression on the electronics package. Also, other arrangements of the improved electronics component assembly are possible that impart shear or torsion alternatively or in addition to compression on the electronics package.

30 Claims, 6 Drawing Sheets

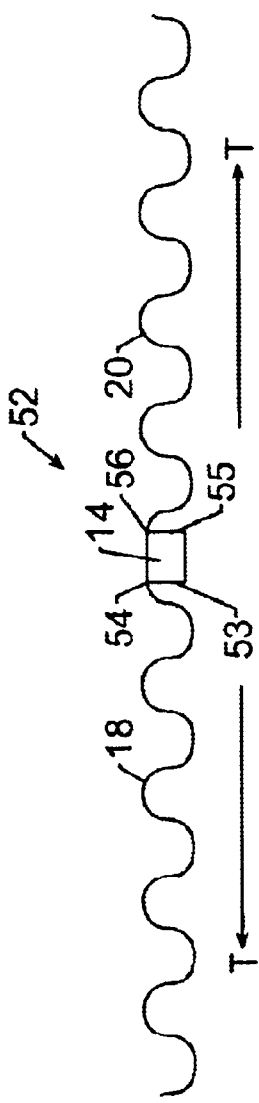
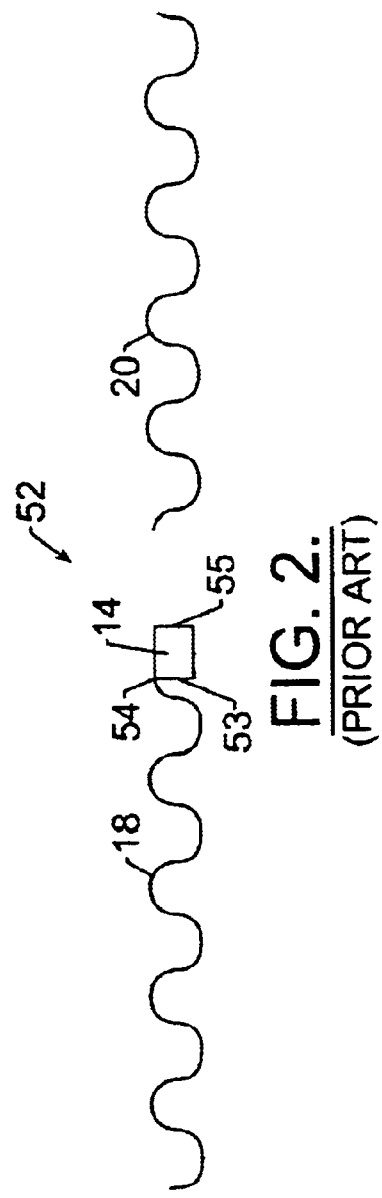

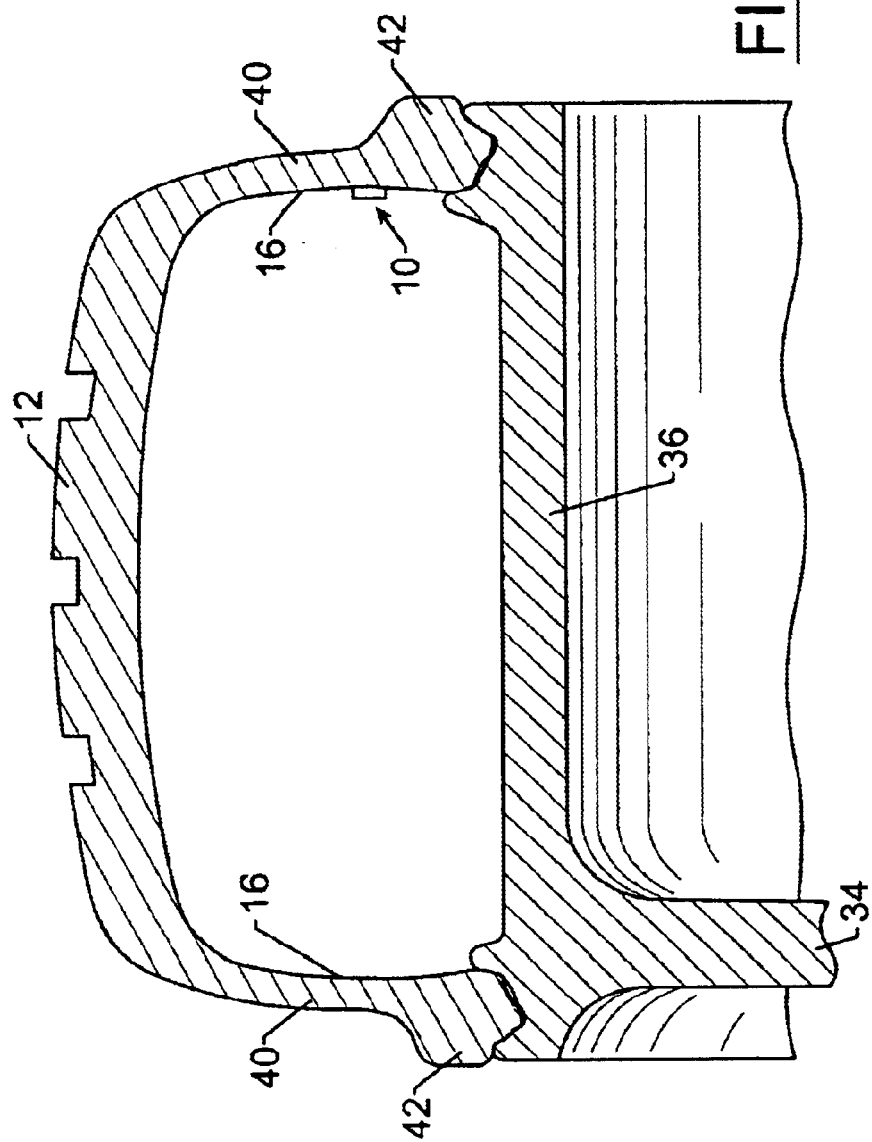

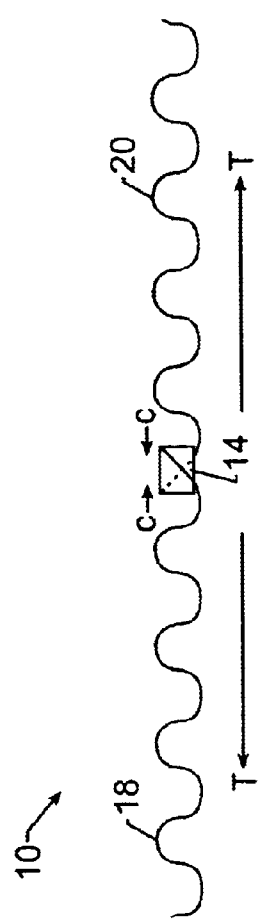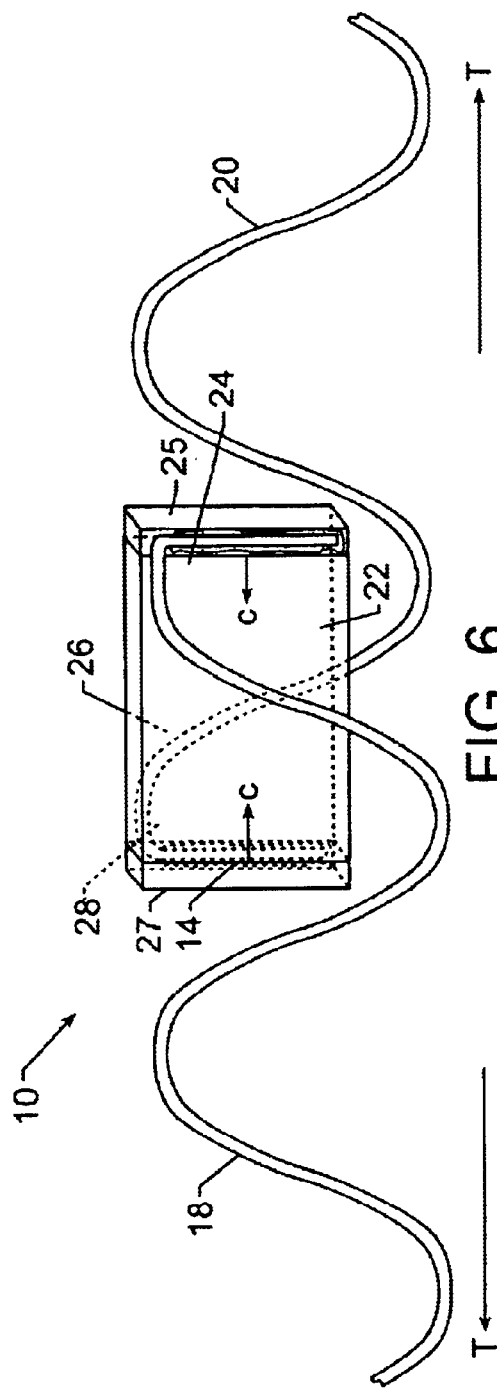

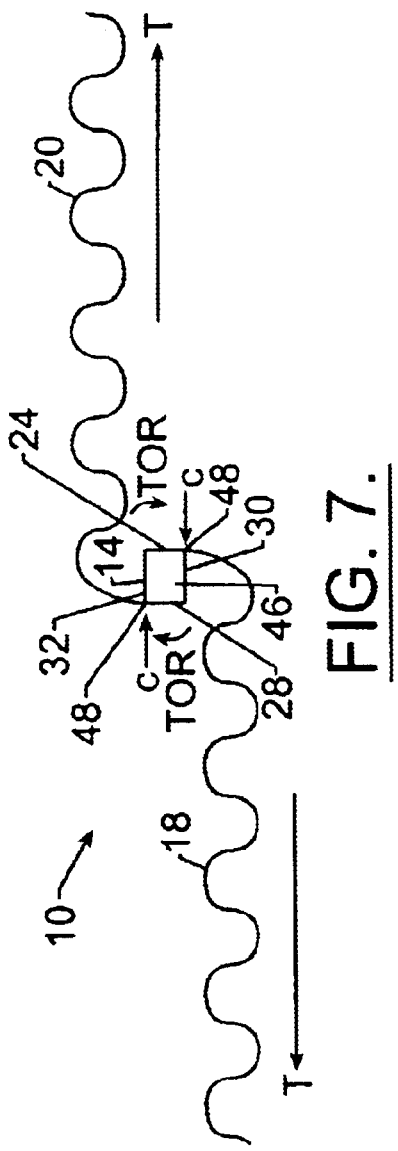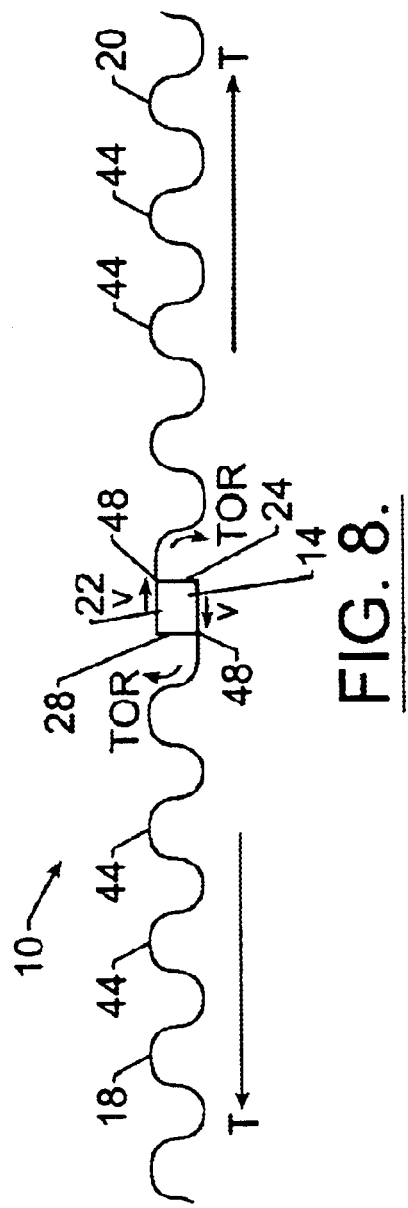

ELECTRONICS COMPONENT ASSEMBLY IN A TIRE FOR REMOTELY MONITORING TIRE CONDITIONS

TECHNICAL FIELD

The present invention relates generally to monitoring apparatuses. More particularly, the present invention relates to an improved electronics component assembly mounted inside of a tire and used for communicating information from the tire.

BACKGROUND

Systems are known to monitor the physical properties of a tire on a vehicle such as the temperature, pressure, and the road surface in contact with the tire.

One way of monitoring the physical properties of a tire includes the use of an electrical component mounted on or within the tire. In addition electronic systems are also used to carry information about the tire, for example identification information, and communicate the information by wireless means.

The electrical component may be mounted inside of the tire to monitor one or more physical properties of the tire and then report these properties to a remote location. In order to aid in communication to and from this remote location, the electrical component may be fitted with one or more antennas. The tire is not a rigid object, but one which is at least partially flexible. The tire may flex during the building process of the tire and through normal use such as driving. As such, the electrical component and the antennas will be connected to a surface that flexes. This flexing can cause tension and other forces to be imparted upon the electrical component and the antennas, resulting in the electrical component being separated from the antennas. Obviously, such a result is undesirable.

The present invention improves upon previous electrical components that have been integrated with tires to monitor physical properties of the tire. The present invention provides for a more robust connection between the antennas and the electrical component used to monitor the tire such that these members will not become disengaged or break upon flexing of the tire.

SUMMARY

Various features and advantages of the invention will be set forth in part in the following description, or may be obvious from the description, or may be learned through practice of the invention.

The present invention provides for an improved electronics component assembly for use in a tire of a vehicle. The invention provides an electronics component that includes an electronics package and an antenna arranged so that the antenna remains firmly connected to the package despite flexing or distortion of the tire substrate on which the component is mounted. According to the invention, an assembly includes an electronics package for communicating a condition of the tire to a remote location, and an antenna having at least one wire connected to the electronics package. The antenna is connected to the electronics package so that tension in the antenna imparts compression on the connection between the antenna and the electronics package.

The present invention also encompasses an exemplary embodiment of an improved electronics component assembly as discussed above where the antenna includes first and second wires which are connected such that shear is imparted on the connection with the electronics package.

Another exemplary embodiment of the present invention exists in an improved electronics component assembly having an antenna that includes first and second wires where the first wire passes across a first side of the electronics package. The first wire may be connected to a first end of the electronics package. The second wire may pass across a second side of the electronics package. The first and second sides of the electronics package are opposite from one another. The second antenna may be connected to a second end of the electronics package. The first and second ends of the electronics package are opposite from one another.

The present invention also encompasses an improved electronics component assembly as discussed above where the first and second wires are connected to the electronics package such that torsion is also imparted on the electronics package.

Another exemplary embodiment of the present invention exists in an improved electronics component assembly as discussed above where the first antenna wire is offset from the electronics package. The first antenna wire may be located proximate to the electronics package on one side of the electronics package. The first antenna wire is connected to a first end of the electronics package. The second antenna wire is offset from the electronics package. The second antenna wire is located proximate to the electronics package on a side of the electronics package opposite from the first antenna wire. The second antenna wire may be connected to a second end of the electronics package.

Additionally, the improved electronics component assembly as immediately discussed may have an electronics package with a rectangular face. The first and second wires may extend from opposite corners of the rectangular face of the electronics package.

Further, in other exemplary embodiments, the improved electronics component assembly may be located on an inner surface of the tire or may be embedded in a wall of the tire. Further, the assembly may, in one exemplary embodiment, be located proximate to a bead of the tire. The assembly could possibly measure the pressure and/or temperature of the tire.

Alternatively, the present invention may include an exemplary embodiment as previously discussed where the connection points of the first and second wires are at different horizontal and vertical locations with respect to a first side of the electronics package.

A further exemplary embodiment of the present invention exists in an improved electronics component assembly as previously discussed where the first wire is offset from the electronics package. The first wire is connected to a second end of the electronics package at an angle of approximately 135° from a flat edge of the second end. The second wire is offset and is connected to a first end of the electronics package at an angle of approximately 135° from a flat edge of the first end.

Additionally, the present invention includes an exemplary embodiment as previously discussed where the electronics package is rotated in orientation with respect to the first and second wires. The diagonally opposite corners of the electronics package may be generally aligned with the first and second wires.

BRIEF DESCRIPTION OF THE DRAWINGS

FIG. 1 is a plan view of a prior electronics component assembly. An antenna has two wires which are connected to an electronics package at the top corners of the electronics package.

FIG. 2 is a plan view of the prior electronics component assembly of FIG. 1 after the assembly has been subjected to flexing. The view shows the second antenna wire being broken off of the electronics package.

FIG. 4 is a partial cross-sectional view of a tire assembly. The view shows the location of the improved electronics component assembly being on an inner portion of the tire proximate to a bead of the tire.

FIG. 5 is a plan view of an exemplary embodiment of an improved electronics component assembly in accordance with the present invention. The view shows a configuration where tension imparted on the two antenna wires is converted into compression on the electronics package.

FIG. 6 is a detailed perspective view of the electronics component assembly shown in FIG. 5. The view shows the first antenna wire being connected to a first end of the electronics package, and the second antenna wire being connected to a second end of the electronics package. The first and second ends are opposite from one another.

FIG. 7 is a plan view of an exemplary embodiment of an improved electronics component assembly in accordance with the present invention. The view shows a connection between the two antenna wires and the electronics package such that tension in the antennas imparts both compression and torsion on the electronics package. The antenna wires are offset from the electronics package.

FIG. 8 is a plan view of an exemplary embodiment of an improved electronics component assembly in accordance with the present invention. The view shows a configuration of the two antenna wires with respect to the electronics package such that tension on the antenna wires imparts shear on the electronics package.

DETAILED DESCRIPTION

Figure 3:
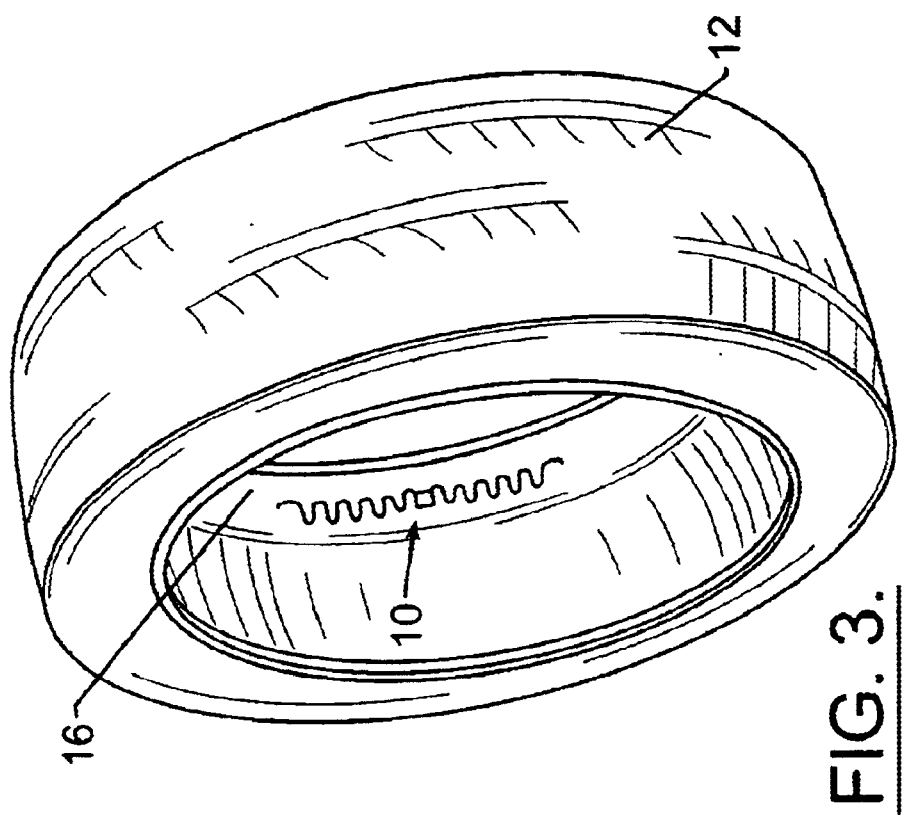
FIG. 3 is a perspective view of a tire. An improved electronics component assembly is shown being located on an inner portion of the tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Referring now to the drawings, a conventional electronics component assembly 52 is shown in FIG. 1. The conventional electronics component assembly 52 has an antenna with a first wire 18 and a second wire 20 connected to an electronics package 14. Connection of these two wires 18 and 20 is made on pads 53, 55, located on opposite sides of the package 14. The wires 18, 20 extend from the package 14 from connection point 54 for the first 18 and a connection point 56 for the second 20. The two connection points 54 and 56 are located at the top of the electronics package and are points at which the antenna are bent away from the direction of the pads 53, 55. When subjected to a tension T in both wires 18 and 20, the electronics package 14 is subjected to a tension force in either direction. Additionally, the connection points 54 and 56 are also acted upon by a tension T to pull the antenna wires 18 and 20 from their respective points 54 and 56. Tension T occurs for example, when a green tire is conformed from a cylindrical shape on the building drum to a toroidal shape for curing. Flexing also occurs during normal driving use of the tire. This tension in the tire causes tension in the antenna wires 18 and 20.

FIG. 2 shows the prior electronics component assembly 52 of FIG. 1 after a tension T has been applied to the assembly 52. Here, the tension T has broken the connection between the second antenna wire 20 and the electronics package 14. Once broken, the prior electronics component assembly 52 cannot function properly.

The present invention makes use of an improved electronics component assembly 10 as shown in FIG. 5. The embodiment shown in FIG. 5 includes an electronics package 14 with an antenna having at least one antenna, including two antenna wires 18, 20. The antenna wires 18, 20 are arranged relative to the electronic package 14 so that tension T imparted on the antenna wires 18, 20 does not subject the electronics package 14 or the connection between the antenna wires 18, 20 and the electronics package 14 to pure tension, thus avoiding the problems illustrated in FIG. 2.

Integrating an improved electronics component assembly 10 with a tire 12 offers the advantages of asset tracking (e.g. tire identification) and measurement of physical properties such as temperature and pressure. The improved electronics component assembly 10 may be a wireless data link that is capable of communicating with an information system outside of the vehicle. For instance, the improved electronics component assembly 10 may communicate with a drive-by interrogator or with a hand-held interrogator. Additionally, the improved electronics component assembly 10 may also communicate with a device onboard the vehicle, for instance an onboard computer.

The improved electronics component assembly 10 may be a device that communicates any type of information to a remote location. The present invention encompasses measurements other than simply the pressure and/or temperature of the tire 12. Additionally, identification information may be transmitted by the electronics component assembly 10. The electronics package 14 may be an integrated circuit made up of a silicon chip and a radio frequency device in one exemplary embodiment of the present invention. The antenna may be constructed out of any material known in the art. For instance, the antenna may be made out of copper, aluminum, and/or nickel. Additionally, the antenna may be made from one or more components. Further, the antenna may be a monopole (single wire), or dipole (two wires) design.

FIG. 3 shows the improved electronics component assembly 10 connected to an inner surface 16 of a tire 12. The improved electronics component assembly 10 may store identification and/or information, and/or be capable of measuring physical properties of the tire 12 during both operational and non-operational states. For instance, the improved electronics component assembly 10 may monitor the pressure of the tire 12 in certain exemplary embodiments. In other exemplary embodiments, the pressure and temperature of the tire 12 may be measured by the improved electronics component assembly 10. This information may be sent to a remote location by the improved electronics component assembly 10 so that a driver may monitor the pressure of the tire 12. The present invention encompasses exemplary embodiments where the information from the improved electronics component assembly 10 is sent to a variety of locations.

A cross sectional view of the tire 12 placed on a wheel 34 is shown in FIG. 4. The wheel 34 has a rim 36 onto which the tire 12 is positioned. The tire 12 has a pair of beads 42 which rest in the bead seats of the rim 36. The tire 12 has a pair of sidewalls 40 which extend from the beads 42 up into the tread portion of the tire 12. The improved electronics component assembly 10 of the present invention is incorporated in the tire structure, and may, in one exemplary embodiment, be affixed to the inner surface of the sidewall 40. Additionally, the improved electronic component assembly 10 may be located on or in other portions of the tire 12, for instance integrated or embedded into the sidewall 40 as opposed to being on the inner surface of the sidewall 40.

In one exemplary embodiment, it is desirable to have the improved electronics component assembly 10 incorporated in the sidewall 40 as close to the axis of rotation of the wheel assembly as possible. This is because during normal use, the portion near the bead 42 experiences the least flexure. To the contrary, the portion of the tire 12 near the tread will flex more due to the load response of the tire 12 and through normal driving forces imparted on the tire 12. As such, the tread portion of tire 12 and the sidewall 40 of tire 12 near the tread portion will exhibit an increased amount of flexing during normal operations of the tire 12. Locating the improved electronics component assembly 10 on a portion of the tire 12 that exhibits an increased amount of flexing will result in an increased tension T being applied to the improved electronics component assembly 10. This increased tension T increases the risk of a failure in the improved electronics component assembly 10 by either damaging the antenna wires 18 and 20, the electronics package 14, or separating the antenna wires 18 and 20 from the electronics package 14. The connection between the antenna wires 18 and 20 and the electronics package 14 needs to be both rigid and flexible at the same time.

It is therefore desirable to move the electronics component assembly 10 as far away from the flexing portions of the tire 12 as possible. However, problems may occur if the improved electronics component assembly 10 is placed too close to the wheel 34 or the rim 36. This is because the wheel 34 and rim 36 are typically made of a material that impedes the transmission of signals from the improved electronics component assembly 10 to the remote location. Preferably, the improved electronics component assembly 10 is placed a small distance from the bead 42. However, it is to be understood that the present invention encompasses various embodiments of an improved electronics component assembly 10 that is placed at a variety of locations within a tire assembly. As such, the present invention encompasses other exemplary embodiments where the location of the improved electronics component assembly 10 is placed at other points besides the one shown in FIG. 4.

The improved electronics component assembly 10 is shown attached to an inner portion 16 of the sidewall 40 of the tire 12. In other exemplary embodiments, the improved electronics component assembly 10 may not be on the inner portion 16 but actually integrated into the sidewall 40. Such a placement may be realized during the construction of the tire 12. However, during the normal build process of the tire 12, flexing may occur, as mentioned. In effect, the improved electronics component assembly 10 must be resistant to being damaged during the normal build process of the tire 12 in addition to normal use of the tire 12 once built.

Referring to FIG. 5 an improved electronics component assembly 10 is shown having a tension T being imparted thereon. FIG. 5 shows a configuration that is advantageous over the configuration shown in FIG. 1. In FIG. 5, the first antenna wire 18 is connected to an opposite side of the electronics package 14 as compared to the one shown in FIG. 1. The second antenna wire 20 is also connected to an opposite side of the electronics package 14 from that shown in FIG. 1. The configuration of FIG. 5 is shown in greater detail in FIG. 6. Referring now to FIG. 6, it can be seen that the first antenna wire 18 passes across a first side 22 of the electronics package 14. The first antenna wire 18 is connected to a pad 25 on a first end 24 of the electronics package 14. Additionally, the second antenna wire 20 passes across a second side 26 of the electronics package 14 and is connected to a pad 27 on a second end 28 of the electronics package 14. The first side 22 is opposite from the second side 26. The wires 18 and 20 may be soldered onto the pads 25 and 27. This connection arrangement may be present in the exemplary embodiments shown in FIGS. 5, and 7–10 but is not shown for sake of clarity.

Tension T in the antenna wires 18 and 20 causes a compression C between the respective antenna wire connection and the electronics package 14 as shown in FIG. 5 and FIG. 6. The connection between the electronics package 14 and the antenna wires 18 and 20 is more resistant to being broken when a compression C is applied than a tension T. As such, the improved electronics component assembly 10 can exhibit a higher amount of resistance to failure during an increased amount of flexing in the tire 12.

The actual physical connection of the antenna wires 18 and 20 to the electronics package 14 may be made by a number of methods. For instance, the antenna wires 18 and 20 may be soldered to a pad 25 on the electronics package 14, as shown in FIG. 6. Additionally, they may be pinned into or onto the electronics package 14, or attached by using clamps, screws, adhesive, or other means, as is known.

FIG. 7 shows an alternative exemplary embodiment of the improved electronics component assembly 10. Here, the first antenna wire 18 is offset relative to the second antenna wire 20 and to the electronics package 14. By "offset", applicants mean that the antenna wires 18 and 20 and electronic package 14 are not in a basic linear arrangement. The "offset" wire 18 is below the electronics package 14 and the "offset" wire 20 is above the electronics package 14 as shown in FIG. 7. The wires 18 and 20 are not offset in FIG. 8 in which they are both in line with the electronics package 14 and with one another.

The two antenna wires 18 and 20 are offset on different sides of the electronics package 14 in FIG. 7. Additionally, the first antenna wire 18 passes next to a side 30 of the electronics package 14. The second antenna wire 20 passes next to a side 32 of the electronics package 14. The sides 30 and 32 are opposite from one another on the electronics package 14. The first and second antenna wires 18 and 20 extend from two diagonally opposite corners 48 of the electronics package 14. However, it is to be understood that in other exemplary embodiments of the present invention, the antenna wires 18 and 20 are not connected to corners 48 but to other locations on the electronics package 14. This could be, for instance, along or on the ends 24 and 28. Further, in other exemplary embodiments of the present invention, the connection points of the first antenna wire 18 and the second antenna wire 20 may be in different horizontal and vertical locations with respect to a rectangular face 46 of the electronics package 14. In other words, they may be connected at points other than the corners 48.

FIG. 7 shows the first antenna 18 wire connected to a first end 24 of the electronics package 14 and the second antenna wire 20 being connected to a second end 28 of the electronics package 14. In effect, this configuration is similar to the configuration shown in FIG. 5 in that the first antenna wire 18 is connected to the first end 24, and the second antenna wire 20 is connected to the second end 28. This type of connection will again cause a compressive force C to be imparted on the electronics package 14 by the antenna wires 18, 20 as is the case in the exemplary embodiment shown in FIG. 5. Here however, due to the offset of the antenna wires 18 and 20 from the electronics package 14, torsion TOR will also be imparted upon the electronics package 14 once a tension T is applied. Therefore, the electronics package 14 will be subjected to both a compression C and a torsion TOR. Again, the connection between the antenna wires 18 and 20 and the electronics package 14 will be more resistant to breaking than in the situation where the connection is subjected only to tension T. Additionally, the electronics package 14 itself will be more resistant to being damaged in that the electronics package 14 is stronger in compression and torsion than in tension. The combination of compression and torsion reinforces the interface.

FIG. 8 shows yet another exemplary embodiment of the present invention where an improved electronics component assembly 10 is configured such that the connection between the first and second antenna wires 18 and 20 is more resistant to breaking than the configuration shown in FIG. 1. In FIG. 8, the first antenna wire 18 is connected to the second end 28 of the electronics package 14 and extends from corner 48. The second antenna wire 20 is connected to the first end 24 of the electronics package 14 and extends from the corner 48. The exemplary embodiment shown in FIG. 8 is different than the exemplary embodiments previously discussed because the antenna wires 18 and 20 are connected to ends 24 and 28 without having to cross over or next to the electronics package 14. Tension on the antenna wires 18, 20 causes a shear V to be imparted in the connection between the antennas wires and electronics package 14. Again, the connection between the electronics package 14 and the antenna wires 18 and 20 is more resistant to breaking when a shear force V is applied as opposed to a pure tension T. These components are most vulnerable to breaking when they are acted upon by a pure tension force T. As can be seen, a slight torsional force TOR will also be present due to the vertical distance between the connection points of the first and second antenna wires 18 and 20. The interface is harder to pull apart if shear V were applied as opposed to tension.

The antenna wires 18 and 20 are provided with a series of undulations 44 as shown in FIG. 8. Any number of undulations 44 may be present in other exemplary embodiments of the present invention. In addition, it is not necessary to have any undulations 44 in other exemplary embodiments of the present invention. The undulations 44 help to protect the antenna wires 18 and 20 from breaking during conformation in manufacturing and during the flexing of the tire 12.

Figure 9:
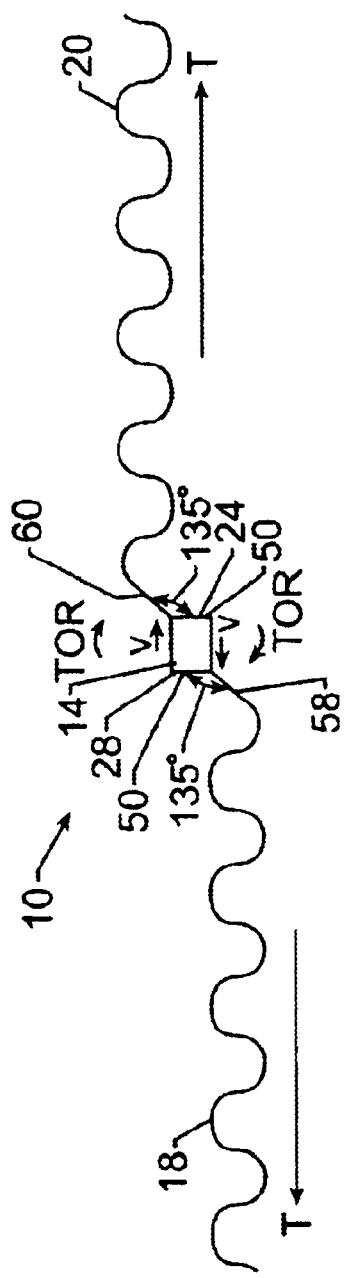
FIG. 9 is an exemplary embodiment of an improved electronics component assembly in accordance with the present invention. The view shows the two antenna wires attached at an approximately 135° angle from a flat edge of the electronics package. Tension in the two antenna wires imparts shear and torsion on the electronics package.

FIG. 9 shows another exemplary embodiment of the present invention where the improved electronics component assembly 10 is subjected to a tensile force T. Here, the first antenna wire 18 is connected to the second end 28 of the electronics package 14. The second end 28 is provided with a flat edge 50. The first antenna wire 18 extends from the edge 5 at an angle of approximately 135°. The first antenna wire 18 is offset from the electronics package 14 onto one side of the electronics package 14. Additionally, the second antenna wire 20 is connected to the first end 24 of the electronics package 14. The first end 24 is provided with a flat edge 50. The second antenna wire 20 extends at an angle of approximately 135° from the flat edge 50. The second antenna wire 20 is offset from the electronics package 14 onto one side of the electronics package 14 and opposite from the side onto which the first antenna wire 18 is offset. Although shown as an angle of 135° in FIG. 9, it is to be understood that the present invention encompasses other exemplary embodiments having angles of various degrees. The angled connection may provide for a more advantageous conversion of Tension T in the wires 18 and 20 into shear V and torsion TOR in the electronics package 14. Additionally, the connection itself may be stronger due to the fact that the angled connection is a smoother transition from the offset wires 18 and 20 than a sharper transition. However, the invention is not limited to having an angle present.

When a tensile force T is applied to both of the antenna wires 18 and 20, a corresponding shear force V is imparted upon the electronics package 14. Additionally, a torsional force TOR is also present. Again, the connection of the first and second antenna wires 18 and 20 is more resistant to breaking when acted upon by a torsional and/or shear force as opposed to simply a tensional force.

Figure 10:
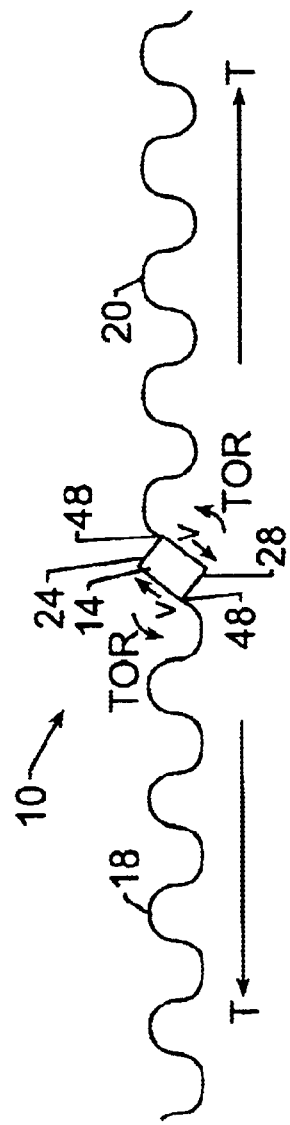
FIG. 10 is an exemplary embodiment of an improved electronics component assembly in accordance with the present invention. The electronics package is rotated in orientation with respect to first and second antenna wires so that diagonally opposite corners of the electronics package are generally aligned with the first and second antenna wires.

FIG. 10 shows another exemplary embodiment of the present invention where the electronics package 14 has been rotated with respect to the first and second antenna wires 18 and 20. The first antenna wire 18 is connected to the second end 28 of the electronics package 14, and the second antenna wire 20 is connected to the first end 24. The antenna wires 18 and 20 are not offset from the electronics package 14 as was the case with the exemplary embodiment shown in FIG. 9. Here, the corners or pads 48 onto which the antenna wires 18 and 20 are attached are generally in alignment with the first and second antennas 18 and 20. However, the pads 48 are not in exact alignment with one another since such a configuration would place the improved electronics component assembly 10 in pure tension once a tensional force T is applied. The pads 48 are only generally aligned with the first and second antenna wires 18 and 20. They are slightly out of alignment and this slight discrepancy causes a torsion TOR and a shear V to be applied to the electronics package 14. Again, the connection between the electronics package 14 and the antenna wires 18 and 20 will be more resistant to breaking than if a pure tension T were applied.

Although the drawings show the electronics package 14 as having a rectangular or square configuration, it is to be understood that in other exemplary embodiments of the present invention, the electronics package 14 may not be rectangular or square shaped.

It should be understood that the present invention includes various modifications that can be made to the improved electronics component assembly 10 for a tire 12 described herein as come within the scope of the appended claims and their equivalents.

We claim:

1. An improved electronics component assembly in a tire comprising:

a tire;

an electronics package for communicating information from said tire to a remote location, said electronics package incorporated in said tire;

at least a first antenna wire incorporated in said tire, and connected to said electronics package;

wherein said at least first antenna wire is connected to said electronics package such that tension in said at least first antenna wire imparts compression on said electronics package; and wherein one end of said first antenna wire is unattached to said electronics package.

2. An improved electronics component assembly in a tire comprising:

a tire;

an electronics package for communicating information from said tire to a remote location, said electronics package incorporated in said tire;

at least a first antenna wire incorporated in said tire, and connected to said electronics package;

wherein said at least first antenna wire is connected to said electronics package such that tension in said at least first antenna wire imparts compression on said electronics package; and wherein said at least first antenna wire passes across a first side of said electronics package and is connected to a first end of said electronics package.

3. The improved electronics component assembly of claim 1, further comprising:
a second antenna wire incorporated in said tire, and connected to said electronics package;
wherein said first and second antenna wires are connected to said electronics package such that tension in said first and second antenna wires imparts compression and torsion on said electronics package.

4. An improved electronics component assembly in a tire comprising:
a tire;
an electronics package for communicating information from said tire to a remote location, said electronics package incorporated in said tire;
at least a first antenna wire incorporated in said tire, and connected to said electronics package;
wherein said at least first antenna wire is connected to said electronics package such that tension in said at least first antenna wire imparts compression on said electronics package;
a second antenna wire incorporated in said tire, and connected to said electronics package;
wherein said first and second antenna wires are connected to said electronics package such that tension in said first and second antenna wires imparts compression and torsion on said electronics package;
wherein said first antenna wire is offset from said electronics package and is located proximate to said electronics package on one side of said electronics package, said first antenna wire is connected to a first end of said electronics package; and
wherein said second antenna wire is offset from said electronics package and is located proximate to said electronics package on a side of said electronics package opposite from said first antenna, said second antenna wire is connected to a second end of said electronics package.

5. The improved electronics component assembly of claim 4, wherein said electronics package has a rectangular face and said first and second antenna wires are connected at opposite corners of said rectangular face of said electronic package.

6. The improved electronics component assembly of claim 1, wherein said electronics package and said at least first antenna wire is located on an inner surface of said tire.

7. The improved electronics component assembly of claim 1, wherein said electronics package and said at least first antenna wire are embedded in said tire.

8. The improved electronics component assembly of claim 1, wherein said electronics package and said at least first antenna wire is located in the sidewall of said tire.

9. The improved electronics component assembly of claim 1, wherein said at least first antenna wire has undulations configured for allowing said at least first antenna wire to flex.

10. The improved electronics component assembly of claim 1, wherein said electronics package is an integrated circuit made up of a silicon chip and a radio frequency device.

11. The improved electronics component assembly of claim 1, wherein said electronics component assembly measures the pressure inside said tire and communicates this pressure to the remote location.

12. The improved electronics component assembly of claim 11, wherein said electronics component assembly measures the temperature inside said tire and communicates this temperature to the remote location.

13. The improved electronics component assembly of claim 1, wherein said electronics component assembly communicates identification information to the remote location.

14. An improved electronics component assembly in a tire comprising:
a tire;
an electronics package for communicating a condition of said tire to a remote location, said electronics package incorporated in said tire;
a first antenna wire incorporated in said tire and connected to said electronics package, said first antenna wire used for communication between said electronics package and the remote location, and wherein one end of said first antenna wire is unattached to said electronics package;
a second antenna wire incorporated in said tire and connected to said electronics package, said second antenna wire used for communication between said electronics package and the remote location; and
wherein said first and second antenna wires are connected to said electronics package such that tension in said first and second antenna wires imparts compression on said electronics package.

15. An improved electronics component assembly in a tire comprising:
a tire;
an electronics package for communicating a condition of said tire to a remote location, said electronics package incorporated in said tire;
a first antenna wire incorporated in said tire and connected to said electronics package, said first antenna wire used for communication between said electronics package and the remote location;
a second antenna wire incorporated in said tire and connected to said electronics package, said second antenna wire used for communication between said electronics package and the remote location;
wherein said first and second antenna wires are connected to said electronics package such that tension in said first and second antenna wires imparts compression on said electronics package;
wherein said first antenna wire passes across a first side of said electronics package and is connected to a first end of said electronics package; and
wherein said second antenna wire passes across a second side of said electronics package, said first and second sides of said electronics package being opposite from one another, said second antenna wire being connected to a second end of said electronics package.

16. The improved electronics component assembly of claim 14, wherein said electronics package and said first and second antenna wires are located on an inner surface of said tire.

17. The improved electronics component assembly of claim 14, wherein said electronics package and said first and second antenna wires are embedded in said tire.

18. The improved electronics component assembly of claim 14, wherein said electronics package and said first and second antenna wires are located in the sidewall of the tire.

19. The improved electronics component assembly of claim 14, wherein said first and second antenna wires have undulations configured for allowing said first and second antenna wires to flex.

20. An improved electronics component assembly in a tire comprising:
- a tire;
- an electronics package for communicating a condition of said tire to a remote location, said electronics package incorporated in said tire;
- a first antenna wire incorporated in said tire and connected to said electronics package, said first antenna wire used for communication between said electronics package and the remote location;
- a second antenna wire incorporated in said tire and connected to said electronics package, said second antenna wire used for communication between said electronics package and the remote location;
- wherein said first and second antenna wires are connected to said electronics package such that tension in said first and second antenna wires imparts compression on said electronics package; and
- wherein said first and second antenna wires are connected to diagonally opposite corners of said electronics package.

21. The improved electronics component assembly of claim 20, wherein said electronics package is rotated in orientation with respect to said first and second antenna wires such that said diagonally opposite corners of said electronics package are generally aligned with said first and second antenna wires.

22. An improved electronics component assembly in a tire comprising:
- a tire;
- an electronics package for communicating a condition of said tire to a remote location, said electronics package incorporated in said tire;
- a first antenna wire incorporated in said tire and connected to said electronics package, said first antenna wire used for communication between said electronics package and the remote location;
- a second antenna wire incorporated in said tire and connected to said electronics package, said second antenna wire used for communication between said electronics package and the remote location;
- wherein said first and second antenna wires are connected to said electronics package such that tension in said first and second antenna wires imparts compression on said electronics package; and
- wherein said first antenna wire is connected to a second end of said electronics package and said second antenna wire is connected to a first end of said electronics package, the connection points of said first and second antenna wires being at different horizontal and vertical locations with respect to a first side of said electronics package.

23. The improved electronics component assembly of claim 14, wherein said first and second antenna wires are connected to said electronics package such that tension is said first and second antenna wires imparts torsion on said electronics package.

24. An improved electronics component assembly in a tire comprising:
- a tire;
- an electronics package for communicating a condition of said tire to a remote location, said electronics package incorporated in said tire;
- a first antenna wire incorporated in said tire and connected to said electronics package, said first antenna wire used for communication between said electronics package and the remote location;
- a second antenna wire incorporated in said tire and connected to said electronics package, said second antenna wire used for communication between said electronics package and the remote location;
- wherein said first and second antenna wires are connected to said electronics package such that tension in said first and second antenna wires imparts compression on said electronics package;
- wherein said first and second antenna wires are connected to said electronics package such that tension is said first and second antenna wires imparts torsion on said electronics package;
- wherein said first antenna wire is offset from said electronics package and is connected to a second end of said electronics package at an angle of approximately 135° from a flat edge of said second end; and
- wherein said second antenna wire is offset from said electronics package and is connected to a first end of said electronics package at an angle of approximately 135° from a flat edge of said first end.

25. The improved electronics component assembly of claim 14, wherein said first and second antenna wires are connected to said electronics package such that tension in said first and second antenna wires imparts shear on said electronics package.

26. The improved electronics component assembly of claim 14, wherein said electronics package is an integrated circuit made up of a silicon chip and radio frequency device.

27. The improved electronics component assembly of claim 14, wherein said electronics component assembly measures the pressure inside said tire and communicates this pressure to the remote location.

28. The improved electronics component assembly of claim 27, wherein said electronics component assembly measures the temperature inside said tire and communicates this temperature to the remote location.

29. The improved electronics component assembly of claim 14, wherein said electronics component assembly communicates identification information to the remote location.

30. An improved electronics component assembly for use in a tire of a vehicle, comprising:
- an electronics package for communicating the pressure of a tire to a remote location, said electronics package located inside of the tire and connected to tire on the side of the tire bead of the tire;
- a first antenna wire located inside of the tire and connected to the tire on the sidewall of the tire proximate to the bead of the tire and connected to said electronics package, said first antenna wire is connected to a second end of said electronics package opposite a direction in which said first antenna extends relative to the electronics package, and wherein one end of said first antenna wire is unattached to said electronics package;
- a second antenna wire located inside of the tire and connected to the tire on the sidewall of the tire proximate to the bead of the tire and connected to said electronics package, said second antenna wire is connected to a first end of said electronics package, opposite a direction in which said second antenna extends relative to the electronics package.

* * * * *